United States Patent [19]

Ota

[11] Patent Number: 5,753,298
[45] Date of Patent: May 19, 1998

[54] METHOD FOR PROCESSING SALMON ROE

[75] Inventor: Yoshiharu Ota, Sapporo, Japan

[73] Assignee: Sato Suisan Kabushiki Kaisha, Hokkaido, Japan

[21] Appl. No.: 655,420

[22] Filed: May 30, 1996

[30] Foreign Application Priority Data

Oct. 6, 1995 [JP] Japan .................................. 7-286441

[51] Int. Cl.⁶ .................................................. A23B 4/02
[52] U.S. Cl. ........................ 426/643; 426/495; 426/478; 426/518; 426/524
[58] Field of Search ..................... 426/643, 495, 426/478, 518, 524

[56] References Cited

U.S. PATENT DOCUMENTS 5,415,886   5/1995   Wakameda et al. ............... 426/643

FOREIGN PATENT DOCUMENTS 0189666   11/1982   Japan ..................... 426/643

*Primary Examiner*—Helen Pratt
*Attorney, Agent, or Firm*—Jordan and Hamburg

[57] ABSTRACT

Salmon or trout ovary is processed into food to make a mouthful of salmon or trout roe. The ovary is taken out of a salmon or trout by incising the salmon or trout abdomen, divided into small ovary pieces of a mouthful size, immersed in saturated salt water, drained to be deprived of salt water, and stored for a prescribed period of time.

14 Claims, 3 Drawing Sheets

METHOD FOR PROCESSING SALMON ROE

BACKGROUND OF THE INVENTION AND RELATED ART STATEMENT

This invention relates to a method for processing salmon roe into food and a device for storing the salmon roe.

When processing the salmon roe into food, generally, the whole of the ovary of a salmon (including a trout), which incorporates numerous salmon eggs (ova) sticky with one another, is taken out by incising the abdomen of the salmon so as to damage salmon ova as little as possible without peeling the ovarian membrane embracing the salmon ova. The salmon roe is thus processed for the reason that the salmon ovary having the ova embraced with the outer membrane appears to be gorgeous and can be sold at high prices. The salmon roe (spawn) taken out of the ovary is immersed in saturated salt water for 15 to 40 minutes, and thereafter, stirred softly. Then, the roe is drained, packed into a packing case and kept in a room at 5° C. to 15° C. for 3 to 6 days as it is so as to have moderate salinity. Thus, the salted salmon roe is obtained and placed on the market so as to be served as ingredients for sandwiches and topping for a canape.

The use of the salmon roe for food calls for the processing of seasoning by immersing the salmon roe in salt water for 15 to 40 minutes. However, the ovaries of the salmons vary in size with the size of the trunk of the salmon, and as well, the amount of salt absorbed into the ovary varies with the size of the ovary. Accordingly, long experience and skill for deciding the time necessary for immersing the ovary in the saturated salt water are required. Furthermore, there is a case where salt cannot uniformly permeate the whole ovary. In this case, the part of the ovary which is sufficiently saturated with salt can be preserved, but the salt excessively absorbed into the ovary causes undesirable overingestion of salt of bad health, resulting in hypertension or other conditions injurious to health. On the other hand, the part of the ovary, which is saturated with insufficient salt, becomes soft, thus losing the commodity value of the salmon roe.

Raw ovary which is completely kept in its original shape covered with the ovarian membrane has been so far considered to be valuable. Therefore, the salmon ovary having the ovarian membrane cut open or divided into pieces is unmarketable. However, in a case where a consumer buys a large salted salmon roe embraced with the unbroken ovarian membrane, his family cannot eat up the salmon roe in volume at a meal and finds it difficult to store and eat up the leftover salmon roe, against the background of the latest tendency toward nuclear families. Therefore, in each family, the salted salmon ovary thus bought is usually dealt with by tearing open the ovarian membrane to take out a lump of salmon roe and cutting the lump into pieces each having a weight of about 50 g. However, when cutting the lump of salmon roe, there is a possibility that ovular fluid (drip) flowing out of the salmon roe may make a kitchen dirty. For these reasons, the consumers tend to hesitate to buy the salmon ovary. Besides, since the ovular fluid filled in the salmon roe tastes good, the expensive salmon roe with reduced ovular fluid loses its value. As a matter of course, the salmon ovary are usually cut appropriately by a food processor so as to permit the salmon roe to be easily eaten and used. Even so, the ovular fluid inevitably leaks out in large quantities from the salmon roe, resulting in lowering its commodity value and yield rate.

Furthermore, although the salmon roe is generally preserved in a packing case, it is apt to be destroyed or injured, forcing out the ovular fluid when being taken out from the packing case, thus rendering the taking-out of the salmon roe difficult.

OBJECT AND SUMMARY OF THE INVENTION

The present invention is made in the light of the foregoing and has an object to provide a method for producing salmon roe having moderate salinity by cutting a salmon ovary incorporating the salmon roe into small pieces capable of being eaten in one mouthful or at a meal, so as to permit salt to uniformly permeate the salmon roe.

Another object of the present invention is to provide a method for processing salmon roe into utility food capable of being used widely as ingredients for a packed lunch or the like in not only general families, but also food makers including, for instance, a lunch provider and a household dish provider.

Still another object of the present invention is to provide a preserving method capable of taking the processed salmon roe out from a packaging case without injuring the salmon roe.

To attain the objects described above according to this invention, there is provided a method for producing salmon roe having moderate salinity by cutting a salmon ovary incorporating the salmon roe into small pieces of a mouthful size, immersing the ovary pieces in saturated salt water, and draining salt water from the ovary pieces.

According to the second method of the present invention, the salmon ovary having the ovarian membrane cut open may be immersed in the saturated salt water, and thereafter, taken apart to salmon roe lumps capable of being eaten in one mouthful and readily stored.

The salted salmon roe produced by either of the aforesaid methods may be preserved in a packing case in such a manner that small pieces into which the salmon ovary is cut are laid flatwise so as to form ovary layers and, the ovary layers are piled one upon another with perforated water-impermeable sheets interposed therebetween. When taking out the salmon ovary pieces from the packing case, the water-impermeable sheet may be pulled up together with the ovary pieces placed thereon. Thus, the salmon ovary pieces can be taken out from the packing case without damaging the salmon roe.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

The first embodiment of the processing method for salmon or trout roe according to the present invention will be described hereinafter.

Figure 1:
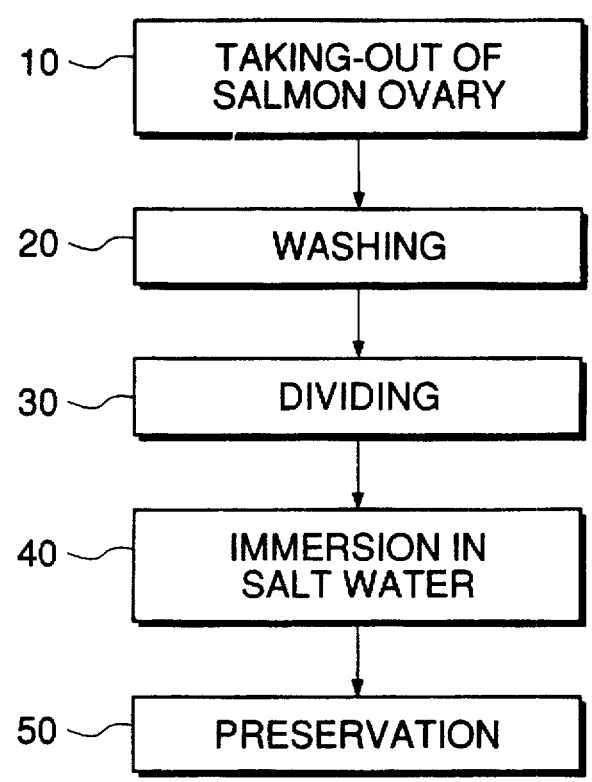
FIG. 1 is a block diagram showing a first embodiment of a method for processing salmon roe according to this invention.

As shown in FIG. 1, first, the abdomen of the salmon or trout is incised to take out the ovary of the salmon or trout (Step 10), and the fresh ovary is washed (Step 20), and drained to be deprived of moisture. Then, the ovarian membrane of the salmon ovary is cut open and divided into small pieces of a mouthful size, e.g. having a weight of about 20 to 50 g (Step 30). At this time, since the salmon roe is apt to be broken, thus causing ovular fluid filled in the salmon roe to be effused, special care should be taken to divide the salmon ovary into small pieces. Thereafter, the divided ovary pieces are put into saturated salt water while stirring the salt water and immersed therein for a prescribed time (Step 40), and then, drained. The saturated salt water is used in concentrations of from 15 to 25 Baume degrees at a temperature of 5° to 15° C. The ovary pieces are immersed for about 5 to 20 minutes. The salt concentration of the salt water and the immersion time may be determined in accordance with freshness of the salmon ovary. Thereafter, the salmon ovary pieces are packed in a packing case and kept in a room at 5° to 20° C. for 3 to 6 days (Step 50), with the result that salt uniformly permeates the salmon ovary pieces little by little. Consequently, salted salmon ovary free from offensive odor can be produced as food.

Next, the second embodiment of the present invention will be described.

Figure 2:
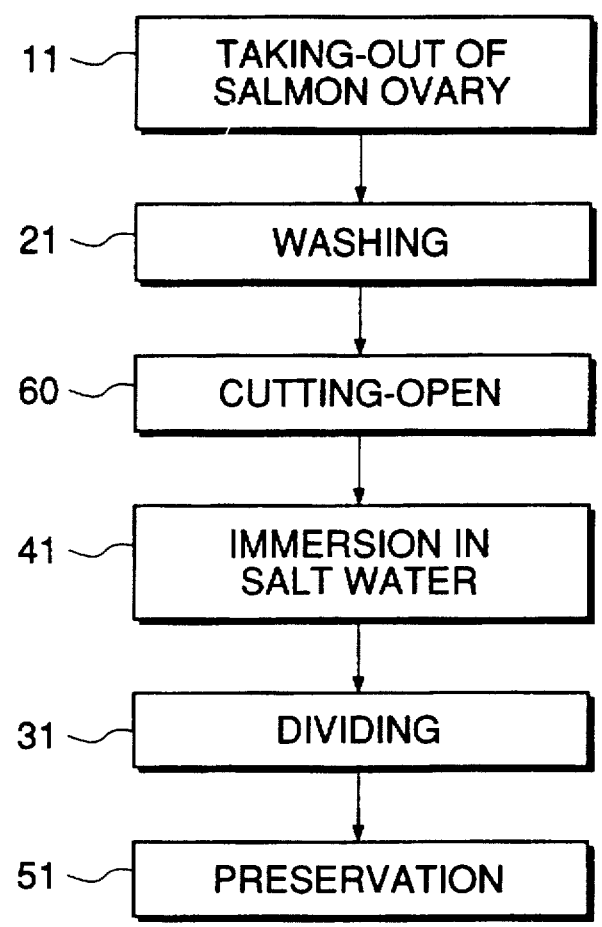
FIG. 2 is a block diagram showing a second embodiment of a method for processing salmon roe according to this invention.

As shown in FIG. 2, the abdomen of the salmon is incised to take out the ovary of the salmon (Step 11), and the fresh salmon ovary is washed (Step 21), and deprived of moisture. Then, the ovarian membrane of the salmon ovary is cut open (Step 60) and immersed with the ovarian membrane kept open in saturated salt water for a prescribed time (Step 41). Upon immersion in the salt water, the salmon ovary is divided into small ovary pieces (Step 31), and then, kept in a packing case for a prescribed time (Step 51). The salt concentration and temperature of the saturated salt water, immersion time, size into which the ovary is divided, and the conditions under the salmon ovary pieces are preserved are the same as those specified in the first embodiment described above.

The device for storing salmon ovary incorporating salmon roe according to the present invention will be described hereinafter.

Figure 3:
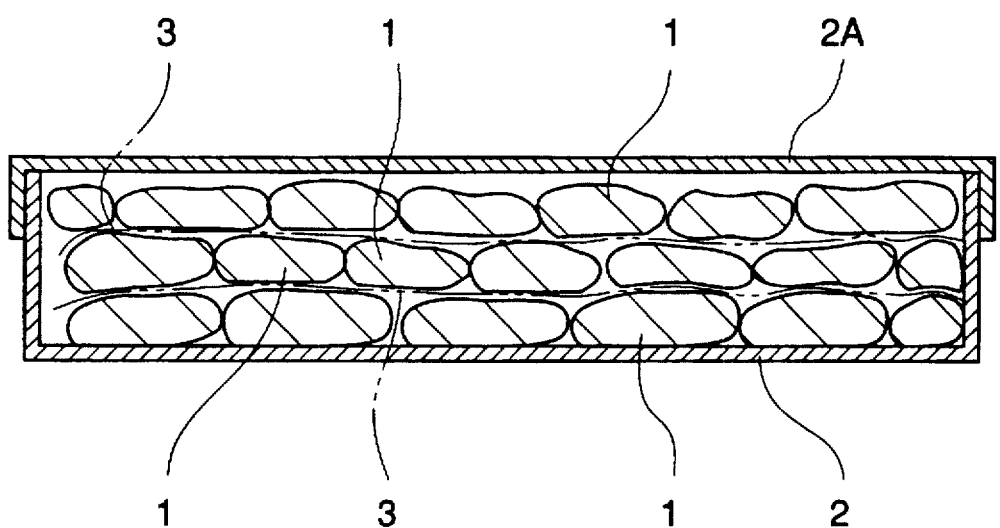
FIG. 3 is a sectional view showing a storage device for salmon roe according to this invention.

The salted salmon roe incorporated in the divided ovary pieces obtained in the final process in the aforementioned processing methods is preserved as shown in FIG. 3.

The salmon ovary pieces 1 divided and immersed in saturated salt water as touched upon above are laid flatwise on the bottom of a packing case 2. The first layer of the ovary pieces 1 thus formed on the bottom of the packing case is covered with a water-impermeable synthetic resin sheet 3. The water-impermeable sheet may be formed of vinyl as one example and has a number of perforations of 5 to 10 mm in diameter at intervals of about 20 mm. Since the perforation in the sheet is smaller in diameter than that of the divided salmon ovary piece, it is more effective to decrease the intervals among the adjacent perforations and increase the number of the perforations so as to facilitate diffusion of salt over the salmon ovary pieces. Next, a second layer of the ovary pieces 1 is laid over the vinyl sheet 3 and further covered with a second vinyl sheet 3 similar to the aforesaid vinyl sheet. Thus, the salmon ovary pieces are packed in the packing case in such a manner that the layers of the ovary pieces 1 and the perforated vinyl sheets 3 are alternately placed one upon another. Finally, the packing case is covered with a lid 2A for preserving the salmon ovary.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for processing salmon roe in which the salmon roe is in the form of a salmon ovary which is embraced in an ovarian membrane, comprising the steps of cutting open the ovarian membrane, dividing the salmon ovary into small pieces of ovary, immersing said pieces of ovary in saturated salt water, and storing said pieces of ovary for a prescribed period of time.

2. A method for processing salmon roe according to claim 1, wherein said pieces of ovary into which said salmon ovary is divided each have a mouthful size.

3. A method for processing salmon roe according to claim 1, wherein said pieces of ovary into which said salmon ovary is divided each have a weight of 20 to 50 g.

4. A method for processing salmon roe according to claim 1, wherein said saturated salt water has a salt concentration of 15 to 25 Baume degrees.

5. A method for processing salmon roe according to claim 1, wherein said pieces of ovary are immersed in the saturated salt water for 5 to 20 minutes.

6. A method for processing salmon roe according to claim 1, wherein said pieces of ovary are stored in a room at 5° to 20° C.

7. A method for processing salmon roe according to claim 1, wherein said pieces of ovary are stored for 3 to 6 days.

8. A method for processing salmon or trout roe in which the roe is in the form of an ovary which is embraced in an ovarian membrane, comprising the steps of cutting the ovarian membrane, dividing the ovary into small pieces of ovary ,immersing said pieces of ovary in saturated salt water, and storing said pieces of ovary.

9. A method for processing salmon or trout roe according to claim 8, wherein said pieces of ovary into which said ovary is divided each have a mouthful size.

10. A method for processing salmon or trout roe according to claim 8, wherein said pieces of ovary into which said ovary is divided each have a weight of 20 to 50 g.

11. A method for processing salmon or trout roe according to claim 8, wherein said saturated salt water has a salt concentration of 15 to 25 Baume degrees.

12. A method for processing salmon or trout roe according to claim 8, wherein said pieces of ovary are immersed in the saturated salt water for 5 to 20 minutes.

13. A method for processing salmon or trout roe according to claim 8, wherein said pieces of ovary are stored in a room at 5° to 20° C.

14. A method for processing salmon or trout roe according to claim 8, wherein said pieces of ovary are stored for 3 to 6 days.

* * * * *